Figure 1:
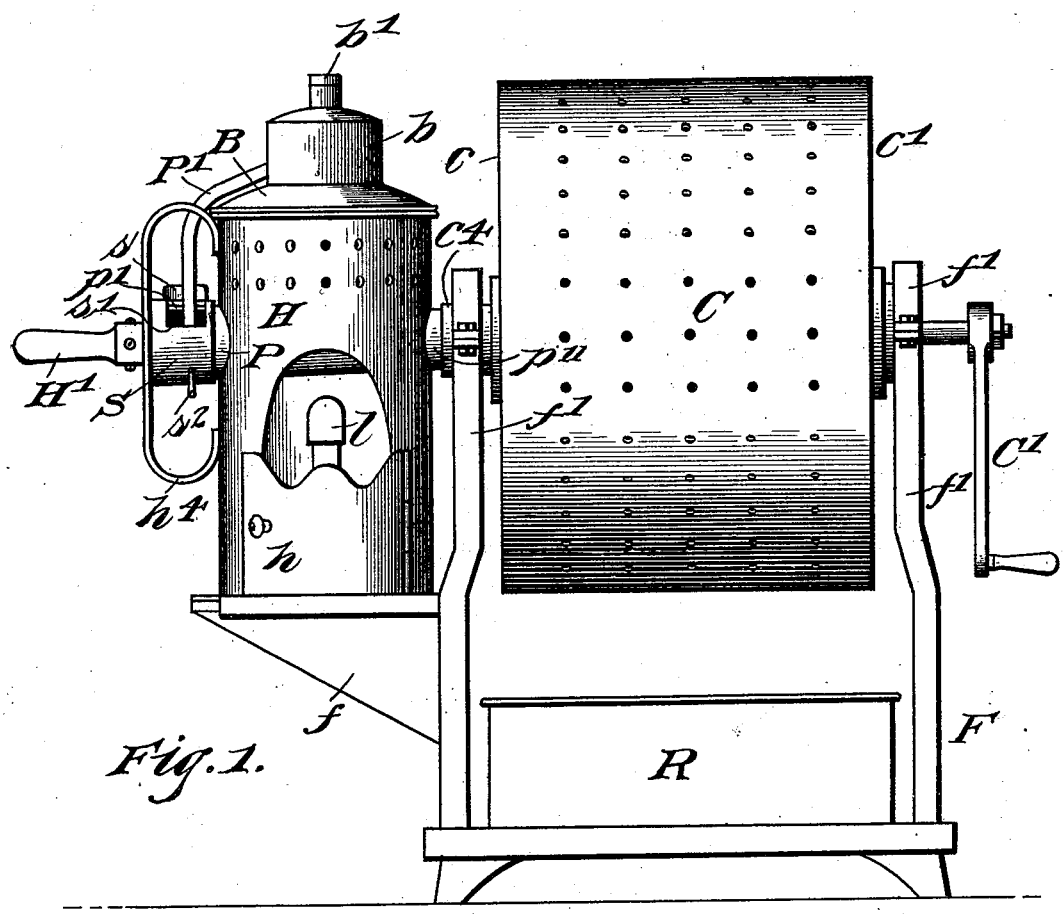

(No Model.) 3 Sheets—Sheet 1.

G. C. OTTEN & K. F. HENNEMAN.
COFFEE ROASTER.

No. 550,999. Patented Dec. 10, 1895.

Witnesses:
B. S. Ober
Henry Orth Jr.

Inventors:
Gerrit Cornelis Otten.
Karel Frederik Henneman.
By Henry Orth Atty (No Model.) 3 Sheets—Sheet 2.

G. C. OTTEN & K. F. HENNEMAN.
COFFEE ROASTER.

No. 550,999. Patented Dec. 10, 1895.

Witnesses:
B. S. Ober
Henry Orth

Inventors:
Gerrit Cornelis Otten
Karel Frederik Henneman
By Henry Orth Atty.

(No Model.) 3 Sheets—Sheet 3.

G. C. OTTEN & K. F. HENNEMAN.
COFFEE ROASTER.

No. 550,999. Patented Dec. 10, 1895.

Witnesses
B. S. Ober.
Henry Orth

Inventors
Gerrit Cornelis Otten.
Karel Frederik Henneman
By Henry Orth
Atty.

UNITED STATES PATENT OFFICE.

GERRIT CORNELIS OTTEN AND KAREL FREDERIK HENNEMAN, OF THE HAGUE, NETHERLANDS.

COFFEE-ROASTER.

SPECIFICATION forming part of Letters Patent No. 550,999, dated December 10, 1895.

Application filed March 16, 1895. Serial No. 542,067. (No model.) Patented in Belgium September 5, 1894, No. 111,674; in Germany September 17, 1894, No. 73,907, and in France January 12, 1895, No. 225,675.

*To all whom it may concern:*

Be it known that we, GERRIT CORNELIS OTTEN and KAREL FREDERIK HENNEMAN, subjects of the Queen of the Netherlands, residing at The Hague, in the Kingdom of the Netherlands, have invented certain new and useful Improvements in Coffee-Roasters, (for which we have obtained patents of addition in Belgium, dated September 5, 1894, No. 111,674; in France, dated January 12, 1895, No. 225,675, and in Germany, dated September 17, 1894, No. 73,907;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention has relation to apparatus for torrefying or roasting vegetable substances, especially coffee, and more particularly to the means of supplying the necessary caloric to the apparatus and regulating the heat supplied.

The invention has for its especial object the provision of means whereby the coffee to be roasted is brought into direct contact with a flame the heat of which is of comparatively great intensity, free from smell or smoke, and readily controlled, and whereby small quantities of coffee can be roasted.

The use of ordinary illuminating-gas for roasting coffee by bringing the latter into direct contact with the ignited gas is well known. Such an apparatus is shown and described in Letters Patent of the United States granted to Karel F. Henneman under date of December 5, 1893, No. 510,068.

In the roasting of coffee by means of an illuminating-gas or a gas highly charged with carbon a perfect combustion of the gaseous fuel is absolutely necessary; otherwise the coffee is liable to become more or less coated with unconsumed carbon and its aroma is detrimentally affected. Furthermore, it is of the greatest importance that the supply of heat to the roaster should be readily controlled.

The disadvantages inherent to the use of illuminating-gas are effectually overcome in the present invention by the use as a source of heat of an alcoholic liquid, as the ordinary alcohol of commerce, suitable means being provided for readily regulating the supply of caloric to the roaster.

That our invention may be fully understood we will describe the same in detail, reference being had to the accompanying drawings, in which—

Figure 3:
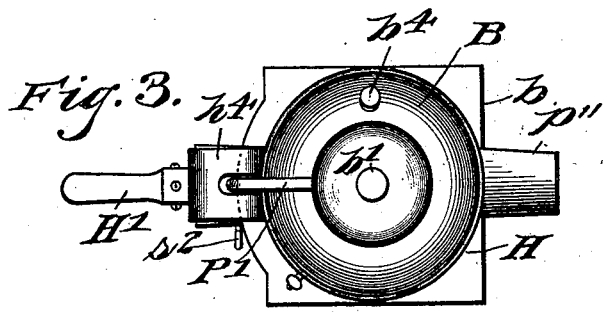
Figure 2:
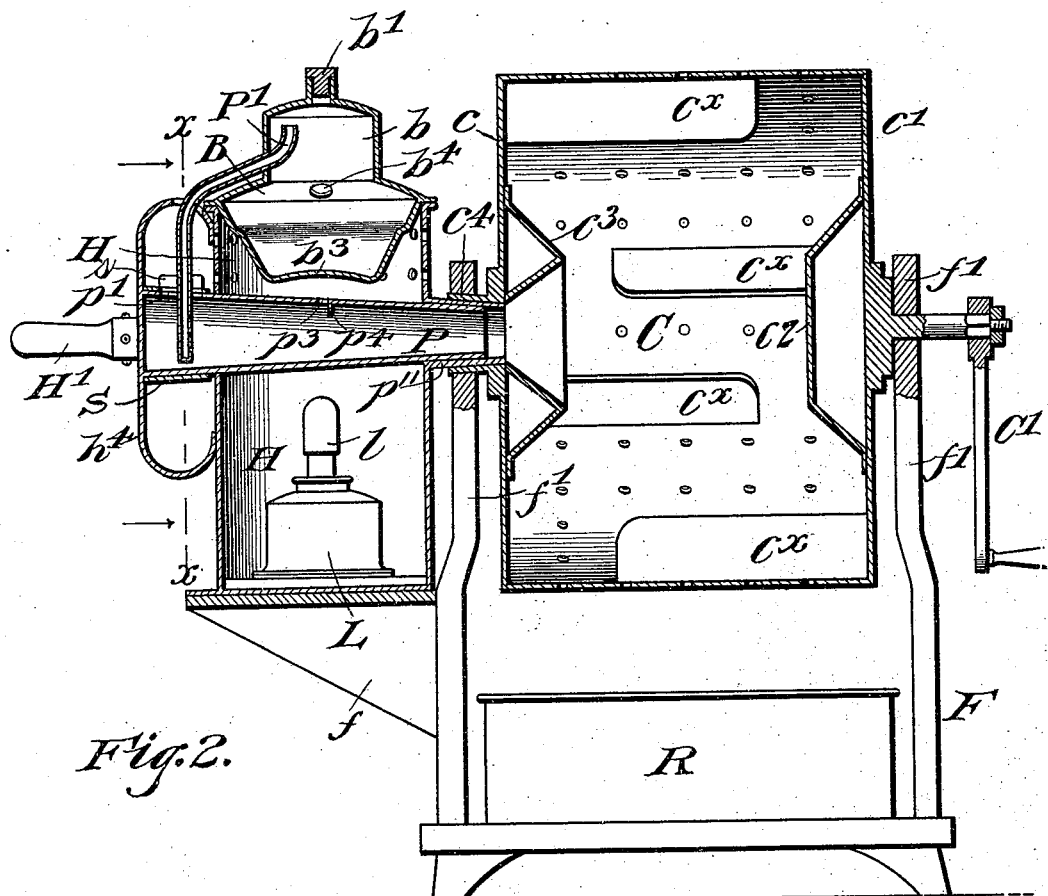
Figure 4:
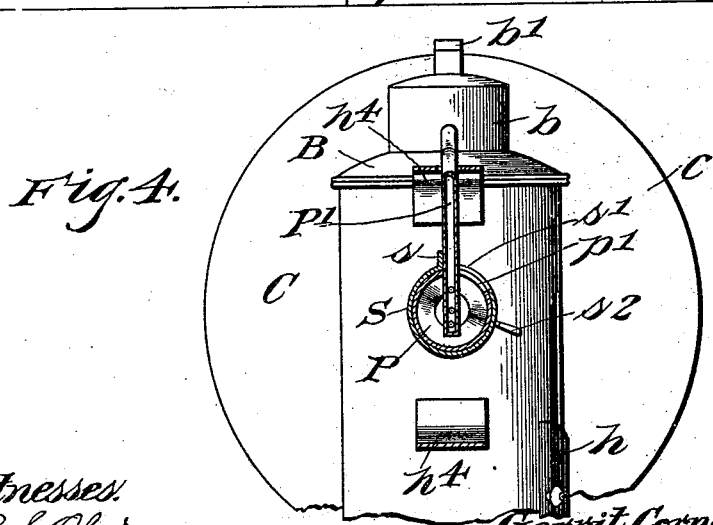
Figure 5:
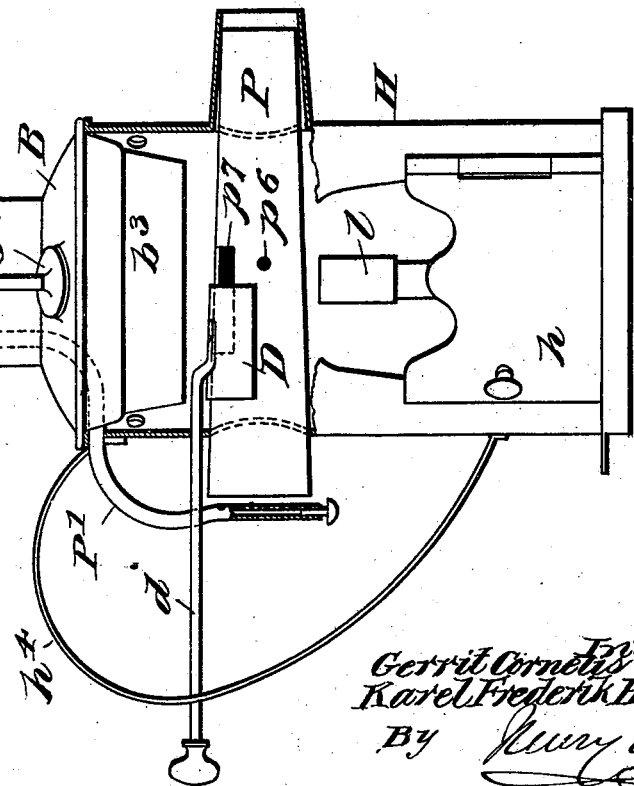

Figure 1 is a side elevation of a coffee-roaster embodying our invention. Fig. 2 is a vertical sectional view thereof. Fig. 3 is a top plan view of the generator. Fig. 4 is a fragmentary section on line $x$ $x$ of Fig. 2, showing the air-port in the vapor-conduit fully uncovered. Fig. 5 is a vertical sectional elevation, and Fig. 6 a top plan view, of the generator detached from the roaster, illustrating structural modifications.

Referring to Figs. 1 to 4, F indicates the frame, from which projects a shelf $f$, adapted to support the vapor generator and burner. C indicates the roasting-cylinder, which may be constructed of a foraminous or a non-foraminous material—as, for instance, perforated or imperforate sheet metal, though we preferably employ perforated sheet metal. The cylinder is provided interiorly with radial ledges or shelves $c^x$, adapted to lift the coffee and allow it to drop again through the flame, said cylinder having a solid journal in its head $c'$ and a tubular journal $c^4$ in its head $c$. On the proximate faces and axially of the heads $c$ and $c'$ are secured truncated cones $c^2$ $c^3$ for the purpose of deflecting the coffee as it drops from the shelves into the path of the flame, the cone $c^3$ having an inwardly-flaring passage communicating with the tubular journal $c^4$ for the purpose of giving spread to the flame and preventing coffee lodging in said passage.

To the solid journal of the cylinder C is secured a crank C' for revolving such cylinder, the journals of which have bearing in suitable frame-uprights $f'$. Below the cylinder C we place a receptacle R for the collection of dust and other matter sifted from the coffee during the operation of roasting and also for the reception and cooling of the roasted coffee.

The generator comprises a boiler or vapor-generator, a burner-pipe connected with the vapor-space of the boiler and with the roasting-cylinder through the taper-passage in cone $c^3$, means for starting the boiler, means for supplying the same with the necessary caloric during the operation of roasting, and means for regulating the supply of air to the vapors in the burner-pipe. The boiler B is provided with a vapor-dome $b$, having a safety-valve $b'$ of any well-known or preferred construction, said boiler being seated in the upper end of a preferably cylindrical casing or housing H, on the bottom of which is placed an alcohol-lamp L for starting the generation of vapor in the boiler B, the housing being provided with an opening partly closed by a door $h$, so as to admit of the ready removal of the lamp L, the wick-tube of which is normally covered by a suitable cap $l$ for well-known purposes.

Below the boiler B and above lamp L is arranged a burner-pipe P, that extends transversely through the housing H, its outer end being closed, while its inner end projects into a tapering sleeve $p^{11}$ on housing H, adapted to fit the correspondingly-tapered tubular journal $c^4$ of the roasting-cylinder C, whereby a practically tight joint is obtained, and yet admits of the ready removal of the housing H and parts connected therewith. The burner-pipe P is connected with the upper part of the dome $b$ of the boiler B by a vapor-pipe $P'$, that projects into said burner-pipe P, its end therein being closed, while that portion of pipe $P'$ within the pipe P is provided with one or more perforations, preferably facing the outlet of pipe P, through which perforations the vapors from the boiler escape. An air-port $p'$ is formed in pipe P near where the pipe $P'$ enters said pipe P, and on the latter is fitted a sleeve S, provided with an abutment $s$, also with an air-port $s'$, corresponding with that in pipe P, and with a handle $s^2$. The arrangement of the sleeve on pipe P is such that when the port $s$ of said sleeve is in full register with the port $p'$ in pipe P the abutment $s$ will bear against said pipe $P'$, and thus act as a stop to limit the rotation of the sleeve in one direction, the handle $s^2$ being then in about a horizontal position. By means of this sleeve S the volume of air admitted to the pipe P can be regulated at will, as it is obvious that when the handle $s^2$ is moved upwardly the sleeve will be rotated on pipe P, thereby gradually closing the port $s'$, and when said port is fully closed the forward edge of the port $s'$ will abut against pipe $P'$, thereby limiting the rotation of the sleeve in a reverse direction from that above referred to.

The pipe P is provided with a burner-orifice $p^3$ in the plane of the vertical axis and facing the bottom $b^3$ of the boiler B, which bottom is preferably concave, so as to deflect and spread the flame issuing from orifice $p^3$ over said bottom, and in order to insure a proper supply of flame to the aforesaid orifice we preferably arrange a deflector-plate $p^4$ proximate to that edge of said orifice which faces the outlet of burner-pipe P, so as to intercept a portion of the flame or vapor therein and direct it to said orifice.

It will be readily understood that as soon as vapor is generated in boiler B by the heat from the lamp L a portion of such vapor will escape from burner-orifice $p^3$ and will be ignited by the flame of said lamp, thereby igniting the vapors in pipe P, thus starting the apparatus, after which the lamp is extinguished. As the roasting proceeds, the intensity of the flame may be gradually reduced by reducing the supply of air to pipe P, as above described, the flame being automatically extingushed as soon as the supply of air to said pipe is cut off.

The advantages derived from our invention are manifold. The use of alcohol as a means for supplying a combustible vapor to the roaster improves the aroma of the coffee instead of deteriorating it, while the coating of the coffee-beans with unconsumed corbonaceous matter is avoided.

The apparatus is perfectly safe, all danger of explosion being avoided by the provision of the safety-valve and by the provision of means for regulating the supply of air to the burner-pipe P.

The apparatus can be readily dismantled, inasmuch as the boiler B may be lifted off the casing H, while the latter, with its starting-lamp, can be as readily removed from the cylinder C and the supporting-bracket $f$ by means of the handle H', secured to a suitable bow or loop $h^4$ on said housing, while the roasting-cylinder C is by preference also removably seated in its bearings.

By supplying a suitable proportion of air to the vapors flowing through burner-pipe P an intensely hot flame is obtained that is projected horizontally from the burner-orifice in deflecting-cone $c^3$ to the face of the deflecting-cone $c^2$ or clear across the roasting-cylinder, nearly filling the latter with flame. The intensity of the flame can be regulated by varying the supply of air to the vapors, and the flame can be extinguished by closing the air-port $p'$ in the manner above described. Finally, by providing the boiler with a vapor collector or dome and locating the feed-port or orifice $b^4$ at the foot of said dome the boiler cannot be completely filled with alcohol, and the escape of the latter through pipes $P'$ and P is thereby avoided.

Instead of controlling the supply of vapor to the burner-pipe through the medium of the air supply this may be effected by directly controlling the caloric supplied to the boiler B, and in order to facilitate the filling, lighting, and extinguishing of the starting-lamp L we preferably attach the same to the door $h$ of the housing H.

Figure 6:
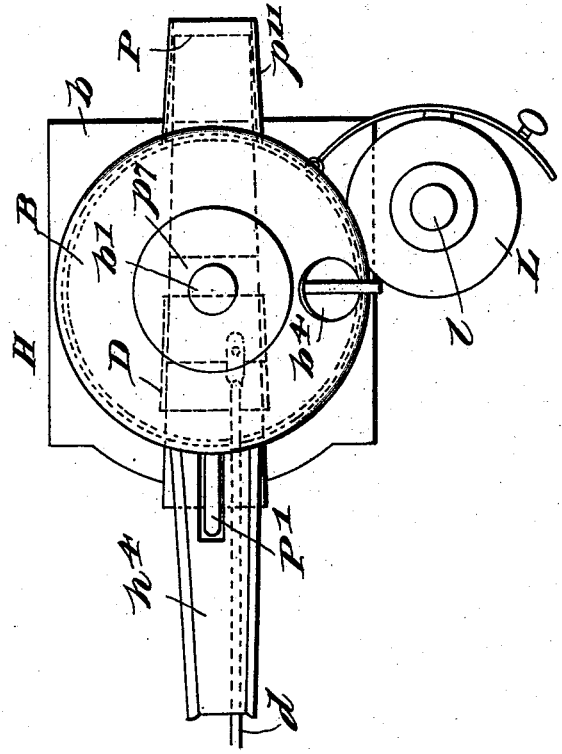

In Figs. 5 and 6 the burner-pipe P is an open-ended one, the vapor-tube $P'$ extending across the open rear end thereof and being provided with a plurality of vapor-ports facing said open rear end of pipe P. The latter pipe is also provided with an igniting-orifice $p^6$ for igniting the vapor within such pipe, and with a burner-orifice $p^7$ immediately below the boiler B, the area of which is controlled by a slide-valve or damper D through the medium of a valve-rod $d$, that has bearing in the bow or handle $h^4$.

It is obvious that by the means described the caloric supplied to the boiler B can be readily and easily controlled or entirely cut off, thereby controlling or stopping the generation of vapor.

In practice we prefer to attach the lamp L to the door $h$ of the housing H, so as to be readily detached therefrom and so as to swing out of said housing when the door is swung open. This may be effected by providing the lamp with a hook-plate $a$ and the door with a like plate or with a loop or socket or other equivalent well-known means, as shown in Fig. 6.

Although we have described our invention in its application to coffee-roasters of comparatively small dimensions particularly designed for family use, we do not desire to limit ourselves thereto, as it is obvious that it may be applied to roasters of large dimension by suitably varying the capacity of the generator and delivering the vapors or air and vapors to a multi-jet burner extending axially across the roasting-cylinder—such, for instance, as the one shown in the United States patent of Henneman above referred to, in which case it may be found desirable to provide the pipe $p$ with a regulating valve or cock.

Having thus described our invention, what we claim as new therein, and desire to secure by Letters Patent, is—

1. A coffee roaster comprising a revoluble roasting cylinder provided with a tubular journal $c^4$, and in combination therewith a housing or casing provided with a tubular sleeve fitting into said journal, a vapor burner supported in the housing and projecting into its tubular sleeve, a vapor generator supported from said housing and connected with the vapor space of the generator, and means for supplying air to the burner, for the purpose set forth.

2. A coffee roaster comprising a revoluble roasting cylinder provided with a tubular journal $c^4$ and a supporting frame for said cylinder provided with a shelf $f$, and in combination therewith a housing or casing supported from the aforesaid shelf and provided with a tubular sleeve fitting the aforesaid tubular journal of the roasting cylinder, a vapor burner extending across the housing and projecting into its sleeve, a vapor generator supported from the housing above the burner, a pipe connection between the latter and the vapor generator, means for supplying heat from the burner to said generator and means for admitting air to the burner, for the purpose set forth.

3. A coffee roaster comprising a revoluble roasting cylinder provided with a tubular journal $c^4$ and a supporting frame for said cylinder provided with a shelf $f$, and in combination therewith a housing or casing supported from said shelf and provided with a sleeve bearing $p^{11}$, a vapor burner extending across the housing and projecting into said sleeve, a vapor generator seated in the upper end of the housing above the burner, a pipe connecting the latter with the vapor space of the generator, means for supplying heat to the same from the burner, means for supplying air to said burner and a starting lamp in the housing below the burner, for the purpose set forth.

4. The combination with the housing H, the vapor burner P extending across said housing and projecting therefrom at both ends, an air admission port near one end of the burner and means for varying the area of said port, of a boiler seated in the upper end of the housing and provided with a vapor dome, a pipe connecting the dome with the vapor burner, and means for supplying heat from the burner to the boiler, substantially as and for the purpose set forth.

5. The combination with the housing H, a boiler provided with a vapor dome seated at the upper end of said housing, the vapor burner P extending across said housing below the boiler and projecting therefrom at both ends, an air admission port near one end of the burner, means for varying the area of the air port, and a flame aperture in said burner facing the boiler, of a pipe extending from the vapor space of the boiler into the burner through the air admission port, substantially as and for the purpose set forth.

6. The combination with the housing H, provided with a door $h$, a boiler provided with a vapor dome seated in the upper end of the housing, the vapor burner P extending across said housing below the boiler and projecting therefrom at both ends, an air admission port near one end of the burner, means for varying the area of the air port, and a flame aperture in said burner facing the boiler, of a pipe extending from the vapor space of the boiler into the burner through the air admission port, and a starting lamp supported from the door of the housing, substantially as and for the purpose set forth.

In testimony that we claim the foregoing as our invention we have hereto signed our names in presence of two witnesses.

GERRIT CORNELIS OTTEN.
KAREL FREDERIK HENNEMAN.

Witnesses:
JOHN JOSEPH HELSDON RIX,
MARIENUS DANE.